UNITED STATES PATENT OFFICE.

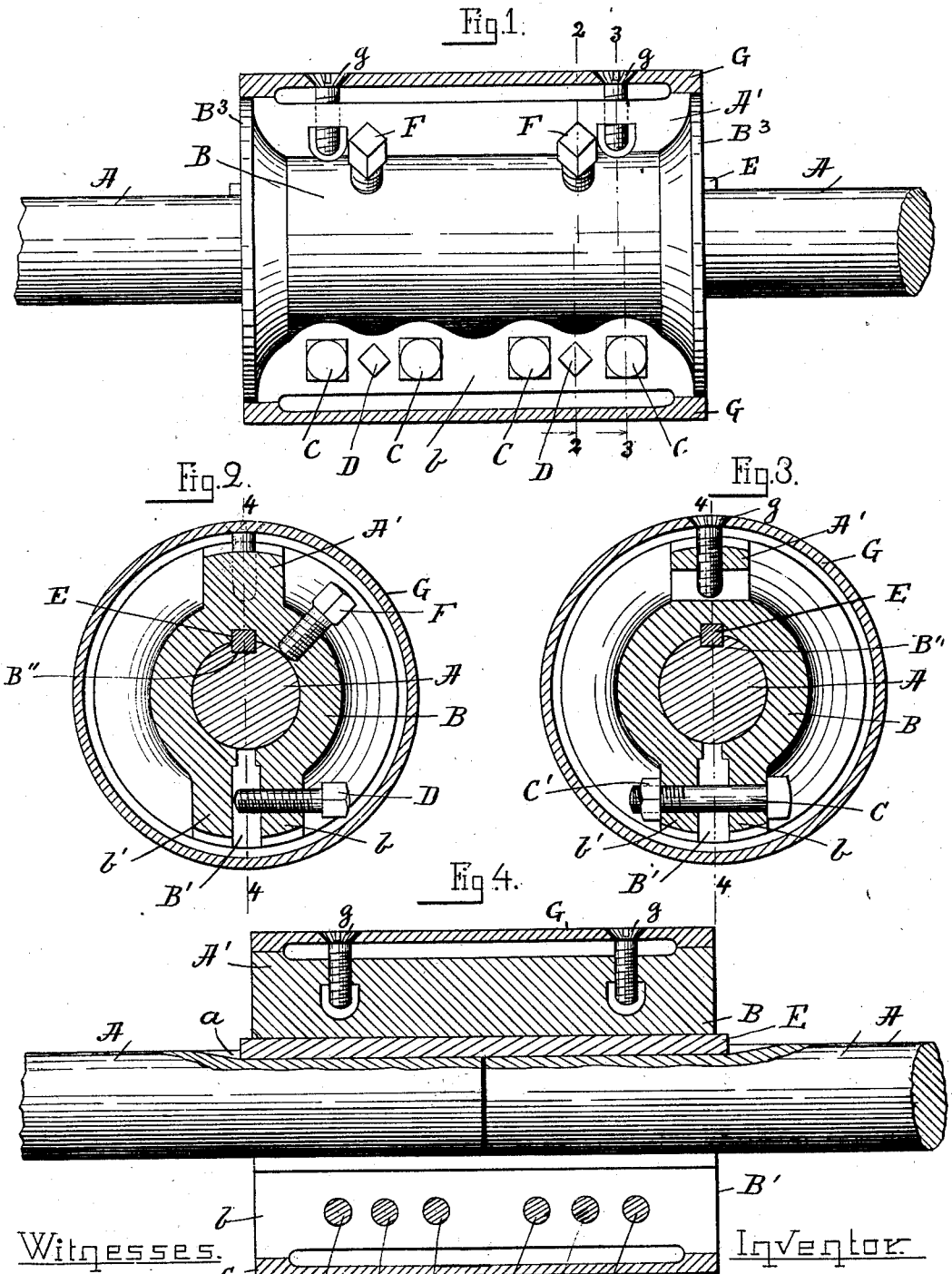

WILSON W. CAREY, OF LOWELL, MASSACHUSETTS.

COMPRESSION SHAFT-COUPLING.

SPECIFICATION forming part of Letters Patent No. 711,284, dated October 14, 1902.

Application filed May 23, 1902. Serial No. 108,650. (No model.)

*To all whom it may concern:*

Be it known that I, WILSON W. CAREY, a citizen of the United States, and a resident of Lowell, in the county of Middlesex and State of Massachusetts, have invented certain new and useful Improvements in Compression Shaft-Couplings, of which the following is a specification.

This invention relates to improvements in compression shaft-couplings for coupling the abutting ends of shafts together, and it is carried out as follows, reference being had to the accompanying drawings, wherein—

Figure 1 is a side elevation of the improved compression shaft-coupling, showing the inclosing shell in section. Fig. 2 is a cross-section on the line 2 2 shown in Fig. 1. Fig. 3 is a similar cross-section on the line 3 3 shown in Fig. 1; and Fig. 4 is a longitudinal section on the line 4 4 in Figs. 2 and 3, showing the shaft in elevation.

Similar letters refer to similar parts wherever they occur on the different parts of the drawings.

In the drawings, A A represent the ends of the shafts adapted to be coupled together, and for such purpose I employ a centrally-perforated hub or sleeve B, preferably made of cast-iron. Said sleeve is longitudinally slitted at B' and at this place provided with longitudinal ribs or flanges $b$ $b'$, made integral with said hub or sleeve B, as shown. The said hub or sleeve is centrally bored out to fit and receive the ends of the shafts A A, as shown.

For the purpose of frictionally securing the hub or sleeve B to the abutting ends of the shafts I employ a series of headed clamping screw-bolts C C, passing loosely through perforations in the flanges $b$ $b'$ and provided with adjustable nuts C' C', which when tightened serve to firmly clamp and compress the slitted, yielding, and longitudinally-perforated hub or sleeve B onto the shafts A A, as shown.

For the purpose of readily placing the coupling onto the shafts to be coupled together I use an expansion device for the purpose of expanding the slitted sleeve or hub, and for such purpose I employ one or more set-screws D D, which are screwed through screw-threaded perforations in one of the flanges or ribs $b$ and adapted to bear against the inner face of the opposite rib or flange $b'$, as shown in Fig. 2, and adapted to expand the said coupling when the clamping-bolts C C are loosened.

When it is desired to secure the coupling to the shaft ends, I first expand said coupling by turning the set-screws D D against the flange or rib $b'$ sufficiently to allow the shaft ends to be readily inserted from opposite ends of the coupling into the longitudinal central perforation therein, after which I loosen the said set-screws and clamp the coupling onto the shafts by tightening the nuts C' C' on the screw-bolts C C, thus securing the coupling firmly to the shafts.

If it is desired to uncouple the device from the shafts, I first loosen the nuts C' C' on the clamping-bolts C C, after which I turn the set-screws D D against the flange or rib $b'$ sufficiently to slightly expand the slitted sleeve or hub B to enable the shafts A A to be readily drawn out of the now-expanded coupling.

In practice I prefer to make on the shafts A A a longitudinal groove $a$ and on the interior of the bore of the hub or sleeve B a similar groove B'' for the reception of a key E, so as to still further secure the coupling to the shafts.

I may, if so desired, still further secure the coupling to the shafts by means of set-screws F F, screwed through the hub or sleeve B and against the shafts A A, as shown.

Diametrically opposite to the flanges or ribs $b$ $b'$ I make on the hub or sleeve B, integral with the latter, a longitudinal rib or projection A', which serves as a balance-weight for the ribs or flanges $b$ $b'$ and their screw-bolts, thus keeping the coupling properly balanced and causing it to run true.

To prevent the clothing, &c., of the workmen from catching on the screw-bolts or set-screws of the device, I prefer to inclose it by means of a shell G, fitted onto cylindrical projections $B^3$ $B^3$ on the ends of the hub or sleeve. Said shell is detachably secured to said coupling by means of screw-bolts $g$ $g$, as shown in the drawings.

What I wish to secure by Letters Patent and claim is—

1. A shaft-coupling consisting of a longitudinally-slitted sleeve, a longitudinal flange or lip on each side of the longitudinal slit in said sleeve, a longitudinal balancing-rib on said sleeve opposite said longitudinal flanges, means adapted to force said flanges apart, means for clamping said flanges together, a shell adapted to surround said sleeve and to be fastened to said balancing-rib and means for preventing the shafts to be clamped from turning in said sleeve.

2. A shaft-coupling consisting of a longitudinally-slitted approximately spool-shaped sleeve, a longitudinal flange or lip on each side of the longitudinal slit in said sleeve, a longitudinal balancing-rib on said sleeve opposite said longitudinal flanges, screws passed through one of said longitudinal flanges and bearing on the inner surface of the other longitudinal flange, for forcing said flanges apart, screw-bolts passing through both of said flanges, for clamping them together, nuts on said screw-bolts, a longitudinal key engaging the inner surface of said sleeve and the outer surface of the shafts to be clamped, and a cylindrical shell fastened to said balancing-rib and inclosing said longitudinal sleeve.

3. A shaft-coupling consisting of a longitudinally-slitted, approximately spool-shaped sleeve, a longitudinal flange or lip on each side of the longitudinal slit in said sleeve, a longitudinal balancing-rib on said sleeve opposite said longitudinal flanges, means adapted to force said flanges apart, means for clamping said flanges together, means for preventing the shafts to be clamped from turning in said sleeve, and a cylindrical inclosing shell fastened to said balancing-rib and bearing against the peripheral end portions of said spool-shaped sleeve.

In testimony whereof I have affixed my signature in presence of two witnesses.

WILSON W. CAREY.

Witnesses:
ALBAN ANDRÉN,
CHAS. H. SMITH.